(12) United States Patent
Ito et al.

(10) Patent No.: US 11,268,628 B2
(45) Date of Patent: Mar. 8, 2022

(54) ELECTROMAGNETIC ACTUATOR

(71) Applicant: CKD Corporation, Komaki (JP)

(72) Inventors: Akihiro Ito, Komaki (JP); Masayuki Kouketsu, Komaki (JP); Masaya Yamauchi, Komaki (JP); Toshikazu Tsuruga, Komaki (JP)

(73) Assignee: CKD CORPORATION, Komaki (JP)

( * ) Notice: Subject to any disclaimer, the term of this patent is extended or adjusted under 35 U.S.C. 154(b) by 114 days.

(21) Appl. No.: 16/905,632

(22) Filed: Jun. 18, 2020

(65) Prior Publication Data

US 2020/0318753 A1 Oct. 8, 2020

Related U.S. Application Data

(63) Continuation of application No. PCT/JP2018/038486, filed on Oct. 16, 2018.

(30) Foreign Application Priority Data

Dec. 25, 2017 (JP) .............................. JP2017-247779

(51) Int. Cl.
*F16K 31/06* (2006.01)
*F16K 3/02* (2006.01)
(Continued)

(52) U.S. Cl.
CPC ........ *F16K 31/0675* (2013.01); *F16K 3/0254* (2013.01); *F16K 3/26* (2013.01);
(Continued)

(58) Field of Classification Search
CPC .. F16K 31/0675; F16K 31/0617; F16K 31/06; F16K 3/0254; F16K 3/26; F16K 17/0433; F16K 47/023
See application file for complete search history.

(56) References Cited

U.S. PATENT DOCUMENTS 723,801 A 3/1903 Rauschenberg
2,690,529 A 9/1954 Lindblad
(Continued)

FOREIGN PATENT DOCUMENTS

CN 204141015 U 2/2015
CN 104896143 9/2015
(Continued)

OTHER PUBLICATIONS

International Preliminary Report on Patentability dated Jun. 30, 2020 from International Application No. PCT/JP2018/038486.
(Continued)

*Primary Examiner* — Daphne M Barry
*Assistant Examiner* — Patrick C Williams
(74) *Attorney, Agent, or Firm* — Beyer Law Group LLP

(57) ABSTRACT

A flow rate ratio control valve includes a pair of plate springs, each of which applies elastic force in a predetermined direction in accordance with the amount of deformation, a valve body supported by the pair of plate springs to be movable in the predetermined direction, a drive unit which drives the valve body in the predetermined direction in a non-contact state by means of electromagnetic force applied to a region between the pair of plate springs in the predetermined direction, a container in which the plate springs and the valve body are contained, and a damper which is attached to the valve body, defines a sectioned predetermined space in cooperation with an inner surface of the container, and forms a predetermined gap between the damper and the inner surface, the predetermined gap establishing communication in the predetermined direction between the predetermined space and the exterior of the predetermined space.

14 Claims, 16 Drawing Sheets

(51) Int. Cl.
    *F16K 3/26* (2006.01)
    *F16K 17/04* (2006.01)
    *F16K 47/02* (2006.01)

(52) U.S. Cl.
    CPC ...... *F16K 17/0433* (2013.01); *F16K 31/0617* (2013.01); *F16K 47/023* (2013.01); *F16K 31/06* (2013.01)

(56) References Cited

U.S. PATENT DOCUMENTS

| | | | |
|---|---|---|---|
| 2,974,682 | A | 3/1961 | Trask |
| 2,983,286 | A | 5/1961 | Greenawalt et al. |
| 3,369,790 | A | 2/1968 | McHale et al. |
| 3,400,736 | A | 9/1968 | Bastle et al. |
| 3,773,082 | A | 11/1973 | Davis |
| 3,894,561 | A | 7/1975 | Thornbery |
| 4,138,089 | A | 2/1979 | McCarthy |
| 4,327,774 | A | 5/1982 | Bauer |
| 4,340,202 | A | 7/1982 | Hargraves et al. |
| 4,463,332 | A * | 7/1984 | Everett ............. H01F 7/1615 335/258 |
| 4,569,504 | A | 2/1986 | Doyle |
| 4,605,197 | A | 8/1986 | Casey et al. |
| 4,635,683 | A | 1/1987 | Nielsen |
| 4,644,760 | A | 2/1987 | Aoki et al. |
| 4,664,136 | A | 5/1987 | Everett |
| 4,669,504 | A | 6/1987 | Fujitsugu et al. |
| 4,674,540 | A | 6/1987 | Takei |
| 4,682,135 | A | 7/1987 | Yamakawa |
| 4,712,582 | A | 12/1987 | Marks |
| 4,988,074 | A | 1/1991 | Najmolhoda |
| 5,070,908 | A | 12/1991 | Hahn |
| 5,605,178 | A | 2/1997 | Jennins |
| 6,068,288 | A | 5/2000 | Karolek et al. |
| 6,182,942 | B1 | 2/2001 | Kadlicko |
| 6,281,772 | B1 | 8/2001 | Adams |
| 6,659,121 | B1 | 12/2003 | Takahashi et al. |
| 7,776,221 | B2 | 7/2010 | Kira |
| 7,845,370 | B2 | 12/2010 | Cook |
| 7,896,029 | B2 | 3/2011 | Yoshimura et al. |
| 8,056,576 | B2 | 11/2011 | Van Weelden |
| 8,579,250 | B1 | 11/2013 | Theobald |
| 8,635,940 | B2 | 1/2014 | Goldfarb |
| 9,127,779 | B2 | 9/2015 | Rivlin |
| 9,620,274 | B2 * | 4/2017 | Nagel .............. F16K 31/06 |
| 10,018,382 | B2 | 7/2018 | Song |
| 10,344,887 | B2 | 7/2019 | Ito et al. |
| 10,544,957 | B2 | 1/2020 | Takeichi |
| 2010/0276500 | A1 | 11/2010 | Rivlin |
| 2012/0323379 | A1 | 12/2012 | Robertson, III |
| 2016/0312908 | A1 | 10/2016 | Thiery et al. |
| 2018/0023723 | A1 | 1/2018 | Ito et al. |
| 2018/0299173 | A1 | 10/2018 | Huang et al. |
| 2019/0011052 | A1 | 1/2019 | Ito et al. |

FOREIGN PATENT DOCUMENTS

| | | |
|---|---|---|
| JP | S50-13963 B | 5/1975 |
| JP | 61-228176 A | 10/1986 |
| JP | 62-060780 U | 4/1987 |
| JP | 2679309 | 8/1997 |
| JP | H10-196831 A | 7/1998 |
| JP | H11-82767 A | 3/1999 |
| JP | 2007-211857 | 8/2007 |
| JP | 2008-259330 A | 10/2008 |
| JP | 2011-506861 A | 3/2011 |
| JP | 2016-53407 | 4/2016 |
| JP | 2017-187162 A | 10/2017 |
| WO | 2017/170939 | 10/2017 |

OTHER PUBLICATIONS

Taiwanese Office Action dated Oct. 28, 2020 for Taiwanese Application No. 108114654.
Taiwanese Office Action from Taiwanese Application No. 107138780 dated Nov. 24, 2020.
Korean Office Action from Korean Application No. 10-2020-7017226 dated Aug. 9, 2021.
Korean Office Action from Korean Application No. 10-2020-7017226 dated Mar. 18, 2021.
Korean Office Action dated Apr. 30, 2018 from Korean Application No. 10-2017-0091854.
International Search Report from International Application No. PCT/JP2017/013413 dated May 30, 2017.
Office Action from U.S. Appl. No. 15/649,390 dated Jan. 23, 2019.
Notice of Allowance dated Apr. 25, 2019 for U.S. Appl. No. 15/649,390.
Chinese Office Action from Chinese Application No. 201780015954.1 dated Jun. 3, 2019.
International Search Report from International Application No. PCT/JP2018/038486 dated Dec. 25, 2018.
Restriction Requirement from U.S. Appl. No. 16/127,807 dated Apr. 1, 2020.
Office Action from U.S. Appl. No. 16/127,807 dated Jun. 5, 2020.
Taiwanese Office Action for Taiwanese Application No. 106118505 dated Jan. 22, 2019.
Chinese Office Action from Chinese Application No. 201780015954.1 from Apr. 2, 2020.
Chinese Office Action from Chinese Application No. 201710594480.2 dated Dec. 3, 2018.
Japanese Office Action from Application No. 2017-247779 dated Jun. 29, 2021.
Korean Office Action from Korean Application No. 10-2018-7025064 dated Sep. 7, 2020.
Office Action from Chinese Application No. 201880078418.0 dated Jul. 22, 2021.
Taiwanese Office Action from Application No. 108114654 dated Apr. 19, 2021.

* cited by examiner

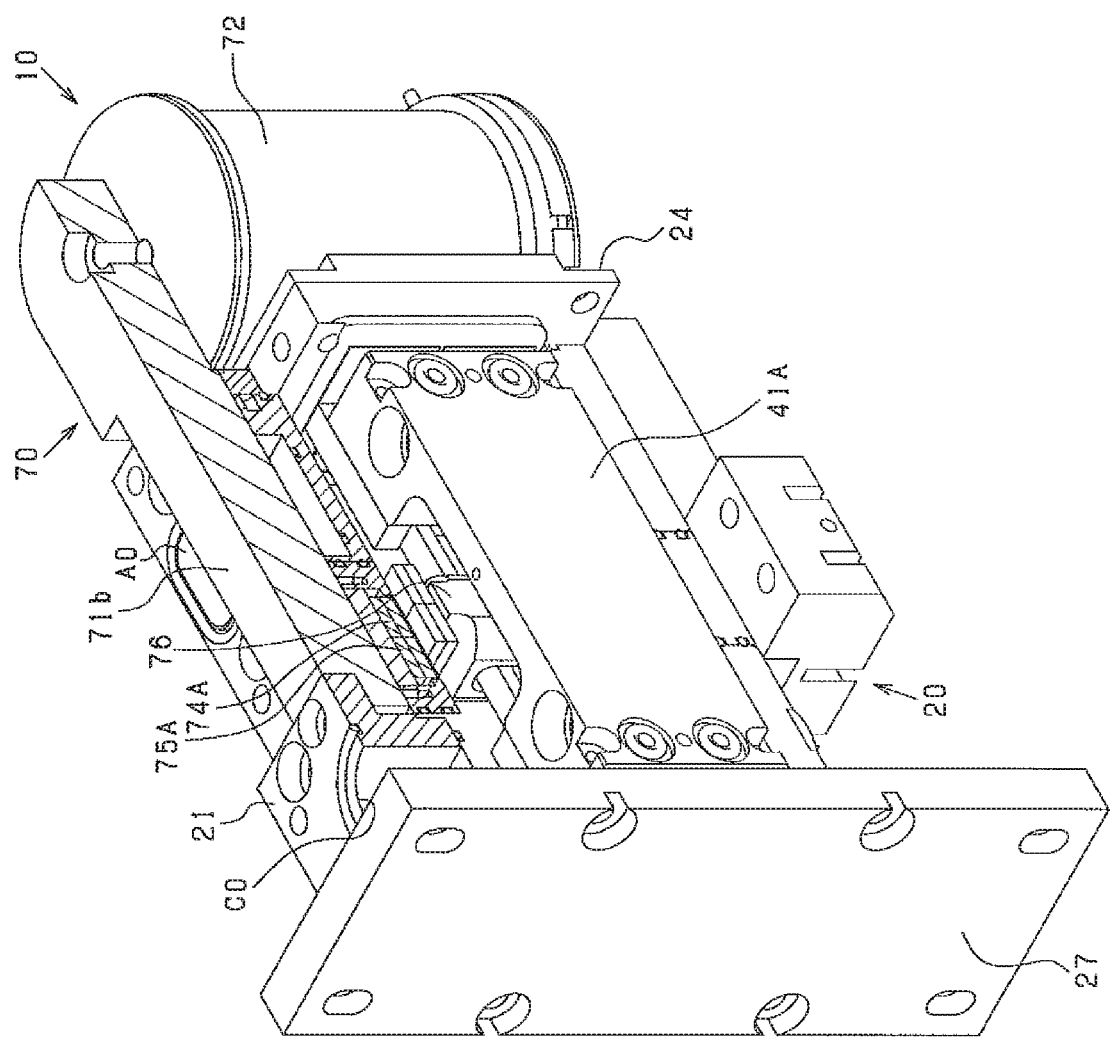
F I G. 1

ELECTROMAGNETIC ACTUATOR

CROSS-REFERENCE TO RELATED APPLICATION

This application is a Continuation of International Patent Application No. PCT/JP2018/038486, filed on Oct. 16, 2018, which claims priority based on Japan Patent Application No. 2017-247779 filed on Dec. 25, 2017, the entire contents of which are incorporated by reference in this specification.

BACKGROUND OF THE INVENTION

1. Field of the Invention

The present disclosure relates to an electromagnetic actuator which drives a movable member by electromagnetic force.

2. Description of the Related Art

One conventional electromagnetic actuator of such a type is a flow passage changeover valve in which opposite ends of a valve body (movable member) are supported by respective plate springs such that a gap is formed between the valve body and a main body, and the valve body is reciprocated in a non-contact state by electromagnetic force (see Japanese Patent Application Laid-Open (kokai) No. 2017-187162). In the flow passage changeover valve having such a configuration, since the valve body can be reciprocated in a state in which the valve body and the main body do not rub against each other, the responsiveness of operation of switching a flow passage can be improved.

BRIEF DESCRIPTION OF THE INVENTION

Incidentally, the persons having disclosed the present application paid attention to the fact that, in the flow passage changeover valve described in Japanese Patent Application Laid-Open (kokai) No. 2017-187162, although generation of frictional force upon drive of the valve body can be prevented, if the valve body starts to oscillate in a direction in which the elastic forces of the plate springs act, the oscillation of the valve body is unlikely to stop.

The present disclosure has been made so as to solve the problem mentioned above, and its main object is to provide an electromagnetic actuator which can improve responsiveness in driving a movable member and which can suppress oscillation of the movable member.

A first aspect for solving the above-described problem is an electromagnetic actuator comprising (a) a pair of plate springs, each of which applies elastic force in a predetermined direction in accordance with an amount of deformation, (b) a movable member supported by the pair of plate springs to be movable in the predetermined direction, (c) a drive unit which drives the movable member in the predetermined direction in a non-contact state by means of electromagnetic force applied to a region between the pair of plate springs in the predetermined direction, (d) a container in which the plate springs and the movable member are contained, and (e) a damper which is attached to the movable member, defines a sectioned predetermined space in cooperation with an inner surface of the container, and forms a predetermined gap between the damper and the inner surface, the predetermined gap establishing communication in the predetermined direction between the predetermined space and the exterior of the predetermined space.

According to the above-described configuration, the pair of plate springs apply elastic force in the predetermined direction in accordance with the amount of deformation of the plate springs. Since the movable member is supported by the pair of plate springs to be movable in the above-mentioned predetermined direction, the movable member can be movably supported without involving sliding movement. The movable member is driven in the predetermined direction in a non-contact state by means of electromagnetic force applied by the drive unit. As a result, no frictional force is produced during the drive of the movable member, whereby responsiveness in driving the movable member can be improved. Furthermore, the movable member is supported by the pair of plate springs, and electromagnetic force is applied to a region between the pair of plate springs in the predetermined direction. Therefore, it is possible to prevent swaying of the movable member when the movable member is driven.

The plate springs and the movable member are contained in the container. The damper is attached to the movable member, and the sectioned predetermined space is defined by the inner surface of the container and the damper. The predetermined gap for establishing communication in the predetermined direction between the predetermined space and the exterior of the predetermined space is formed between the inner surface of the container and the damper. Therefore, when the damper is driven in the predetermined direction together with the movable member, fluid flows into or flows out of the predetermined space through the predetermined gap. Accordingly, by means of resistance acting on the fluid when passing through the predetermined gap, damping force for damping oscillation of the movable member can be applied to the movable member, and oscillation of the movable member can be suppressed. Furthermore, since oscillation of the movable member can be damped without involving sliding movement of the movable member in relation to another member, a decrease in the responsiveness of the movable member can be suppressed.

In accordance with one embodiment of the present invention, the movable member may be a valve body having an open flow passage which is open to a predetermined surface of the valve body over a predetermined length in the predetermined direction, wherein the electromagnetic actuator further comprises a main body in which a plurality of ports open to its facing surface facing the predetermined surface are formed such that the ports are arranged in the predetermined direction at an interval shorter than the predetermined length and in which connection flow passages connected to the plurality of ports, respectively, are formed, and wherein the container contains the main body.

According to the above-described configuration, fluid can be caused to flow, through the connection flow passages formed in the main body, to or from the ports connected to the connection flow passages. The valve body has the open flow passages which are open to the predetermined surface over the predetermined length in the predetermined direction. In the main body, a plurality of ports which are open to the facing surface facing the predetermined surface are formed such that the ports are arranged at the interval shorter than the predetermined length in the predetermined direction. Therefore, by driving the valve body in the predetermined direction by the drive unit, the state of connection of the plurality of ports through the open flow passages of the valve body; i.e., the flow state of the fluid, can be controlled.

Furthermore, the container which contains the plate springs and the valve body (the movable member) therein contains the main body. Therefore, the fluid having flowed from the above-described ports to a region around the valve body flows through the interior of the container and flows in or flows out of the above-described predetermined space through the above-described predetermined gap. Accordingly, the fluid whose flow state is controlled by the valve body can be used as fluid for damping oscillation of the movable member. Therefore, it is unnecessary to separately prepare fluid dedicated for the damper.

In accordance with one embodiment of the present invention, the damper may be attached to the movable member to be located further outward from the movable member than a corresponding one of the plate springs as viewed in the predetermined direction. Therefore, as compared with a structure in which the damper is attached to the movable member to be located closer to the movable member than the plate spring as viewed in the predetermined direction, it becomes easier to reduce the size of the predetermined space defined by the damper and the inner surface of the container. Therefore, the predetermined space can be formed easily.

In accordance with one embodiment of the present invention, the damper may be formed into a plate shape; and the predetermined gap is formed into an annular shape between the inner surface and an outer circumferential surface of the damper.

According to the above-described configuration, since the damper is formed to have a plate-like shape, the shape of the damper can be simplified, and the space in which the damper is disposed can be made smaller. The predetermined gap is annular and formed between the inner surface of the container and the outer circumferential surface of the damper. Therefore, it is possible to prevent the resistance of the fluid from unevenly acting on a portion of the damper. As a result, it becomes easier to stabilize the attitude of the damper and thus the attitude of the movable member.

In accordance with one embodiment of the present invention, the damper is fixed to the movable member such that a main face of the damper having the largest area becomes perpendicular to the predetermined direction. Therefore, when the damper is driven in the predetermined direction together with the movable member, it is possible to cause the fluid to impinge against the damper at a right angle, thereby preventing leaning of the damper and tilting of the movable member.

In accordance with one embodiment of the present invention, when the movable member is driven in the predetermined direction in a non-contact state by the drive unit, a size of the predetermined gap is maintained constant. Therefore, when the movable member is driven, it is possible to suppress changes in the flow of the fluid passing through the predetermined gap, and it becomes easier to stabilize the attitude of the damper and thus the attitude of the movable member.

In accordance with one embodiment of the present invention, the predetermined space is formed in an end of the container in the predetermined direction. Therefore, in the electromagnetic actuator, the predetermined space can be secured easily, and interference between the damper and another component can be prevented more easily.

Specifically, as in an eighth means, there may be employed a configuration in which the predetermined gap has a size of 0.2 mm to 5 mm. When such a configuration is employed, an adequate damping force can be applied to the driven movable member. Thus, it is possible to suppress a decrease in the responsiveness of the movable member while damping oscillation of the movable member.

In accordance with another aspect of the invention, an electromagnetic actuator includes (a) a pair of plate springs, each of which applies elastic force in a predetermined direction in accordance with an amount of deformation, (b) a valve body supported by the pair of plate springs to be movable in the predetermined direction and controlling a flow state of liquid, (c) a drive unit which drives the valve body in the predetermined direction in a non-contact state by means of electromagnetic force applied to a region between the pair of plate springs in the predetermined direction, (d) a container in which the plate springs and the valve body are contained, and (e) a damper which is attached to the valve body and forms a predetermined gap between the damper and an inner surface of the container, the liquid passing through the predetermined gap in the predetermined direction.

According to the above-described configuration, the flow state of the liquid is controlled by the valve body. The damper is attached to the valve body, and the predetermined gap is formed between the inner surface of the container and the damper. The damper allows the liquid to pass through the predetermined gap in the predetermined direction. Therefore, when the damper is driven in the predetermined direction together with the valve body, by means of resistance acting on the liquid when passing through the predetermined gap, damping force for damping oscillation of the valve body can be applied to the valve body, and oscillation of the valve body can be suppressed. Furthermore, since oscillation of the valve body can be damped without involving sliding movement of the valve body in relation to another member, a decrease in the responsiveness of the valve body can be suppressed. In addition, since the liquid whose flow state is controlled by the valve body can be used as liquid for damping oscillation of the valve body, it is unnecessary to separately prepare liquid dedicated for the damper.

In accordance with one embodiment of the present invention, the valve body has an open flow passage which is open to a predetermined surface of the valve body over a predetermined length in the predetermined direction, wherein the electromagnetic actuator further comprises a main body in which a plurality of ports open to its facing surface facing the predetermined surface are formed such that the ports are arranged in the predetermined direction at an interval shorter than the predetermined length and in which connection flow passages connected to the plurality of ports, respectively, are formed, and wherein the container contains the main body. According to such a configuration, an action and an effect similar to those of the second means can be attained.

In accordance with one embodiment of the present invention, the damper is attached to the valve body to be located further outward from the valve body than a corresponding one of the plate springs as viewed in the predetermined direction. According to such a configuration, an action and an effect similar to those of the third means can be attained.

In accordance with one embodiment of the present invention, the electromagnetic actuator further comprises a positioning pin which prevents the damper from rotating along a plane perpendicular to the predetermined direction.

According to the above-described configuration, the damper is prevented, by the positioning pin, from rotating along a plane perpendicular to the predetermined direction. Therefore, it is possible to reliably prevent the predetermined gap from changing as a result of rotation of the damper and to prevent the attitude of the damper and thus the attitude of the movable member from changing.

BRIEF DESCRIPTION OF THE DRAWINGS

The above and other objects, features, and advantages of the present disclosure will be apparent from the following detailed description made with reference to the accompanying drawings.

FIG. 1 is a perspective sectional view showing a flow rate ratio control valve.

DETAILED DESCRIPTION OF EMBODIMENTS OF THE INVENTION

One embodiment in which the present disclosure is applied to a flow rate ratio control valve for controlling the flow rate ratio of refrigerant (liquid) supplied from a common port to two output ports will now be described with reference to the drawings.

Figure 2:
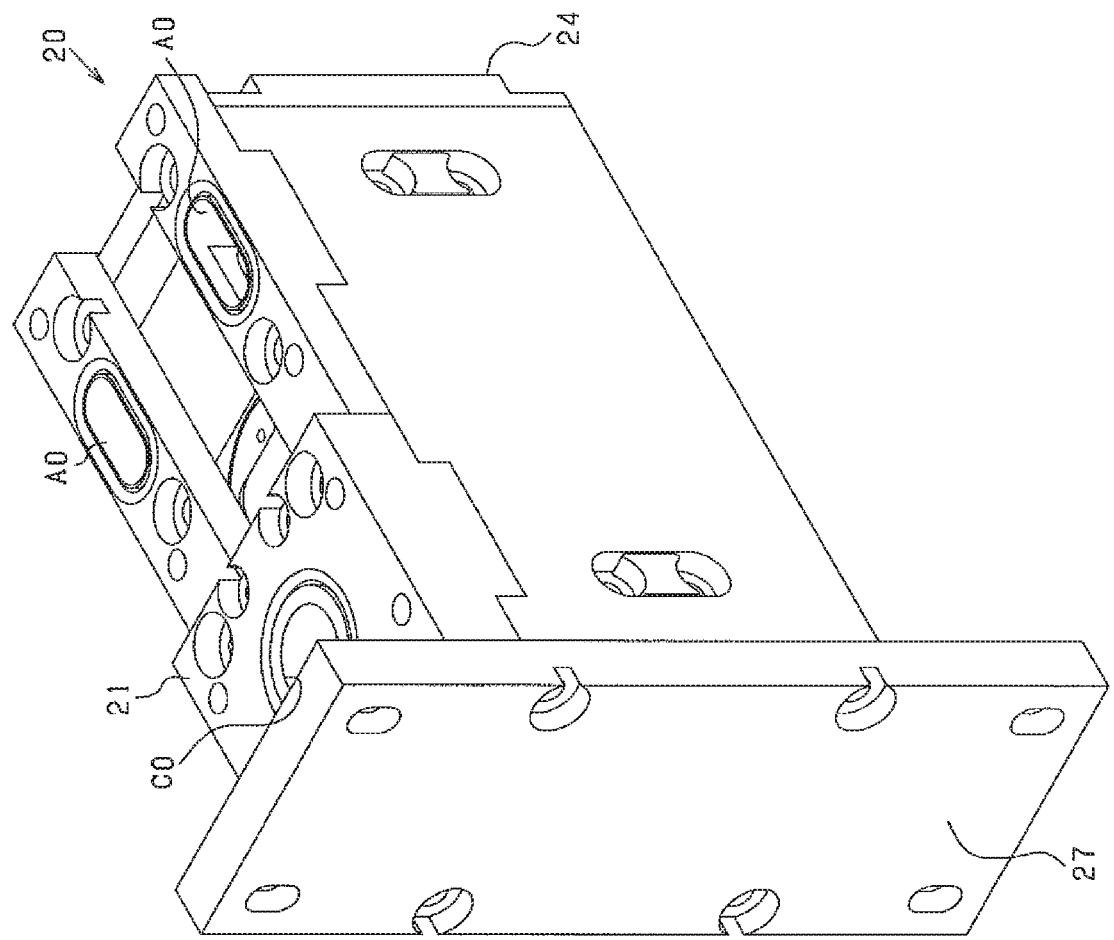
FIG. 2 is a perspective view showing ports of a valve mechanism and a portion therearound.
Figure 3:
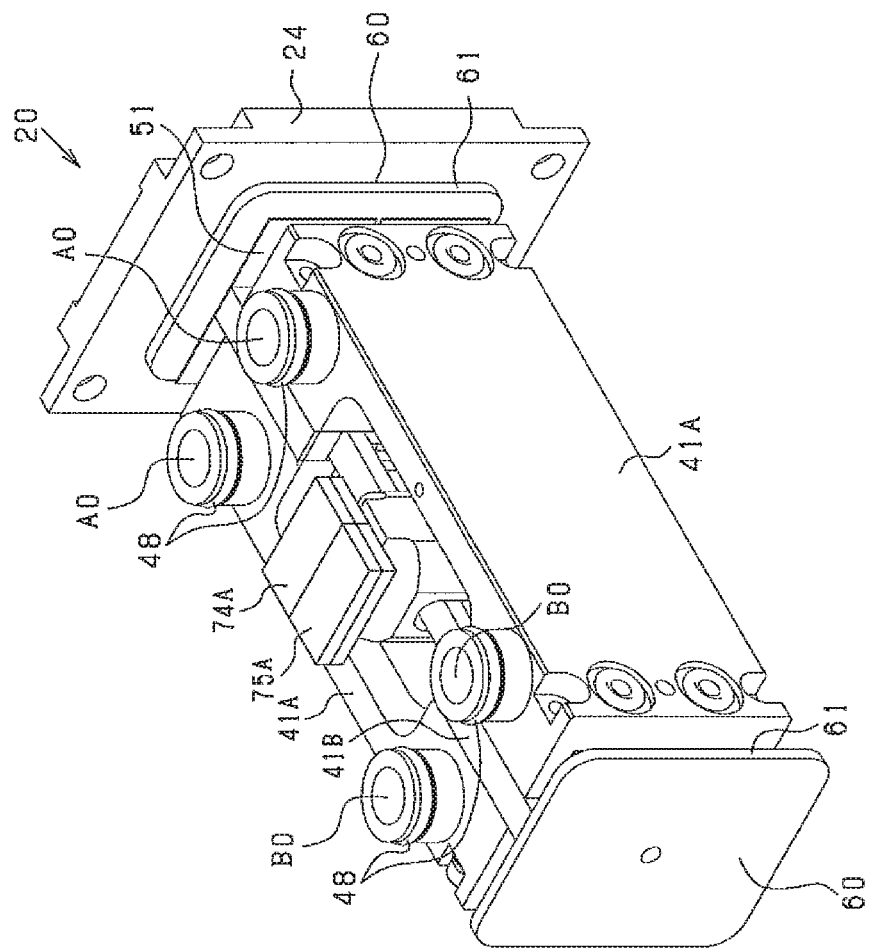
FIG. 3 is a perspective view showing the ports, main bodies, plate springs, magnets, etc.

As shown in FIGS. 1 to 3, the flow rate ratio control valve 10 (corresponding to the electromagnetic actuator) includes a valve mechanism 20 and a drive unit 70. The valve mechanism 20 and the drive unit 70 are connected to each other through a connection member 24. The drive unit 70 drives a valve body 31 (see FIG. 4) of the valve mechanism 20.

The valve mechanism 20 includes a housing 21, the valve body 31, first main bodies 41A (main bodies), second main bodies 41B, plate springs 51, a cover 27, etc. The housing 21, the valve body 31, the first main bodies 41A, the second main bodies 41B, the plate springs 51, and the cover 27 are formed of a non-magnetic material.

FIG. 2 shows the flow rate ratio control valve 10 of FIG. 1, with the drive unit 70 removed therefrom. As shown in FIG. 2, the housing 21 has a rectangular tubular shape (composed of a plurality of parts). The housing 21 has a C0 port (common port) to which refrigerant (corresponding to fluid) is input, A0 ports (first output ports) from which the refrigerant is output, and B0 ports (second output ports) from which the refrigerant is output. The C0 port, the A0 ports, and the B0 ports are formed of a non-magnetic material. An input flow passage, first output flow passages, and second output flow passages are connected to the C0 port, the A0 ports, and the B0 ports, respectively. The input flow passage has an opening on the inner surface of the housing 21. The first output flow passages and the second output flow passages are connected to the first main bodies 41A.

Figure 4:
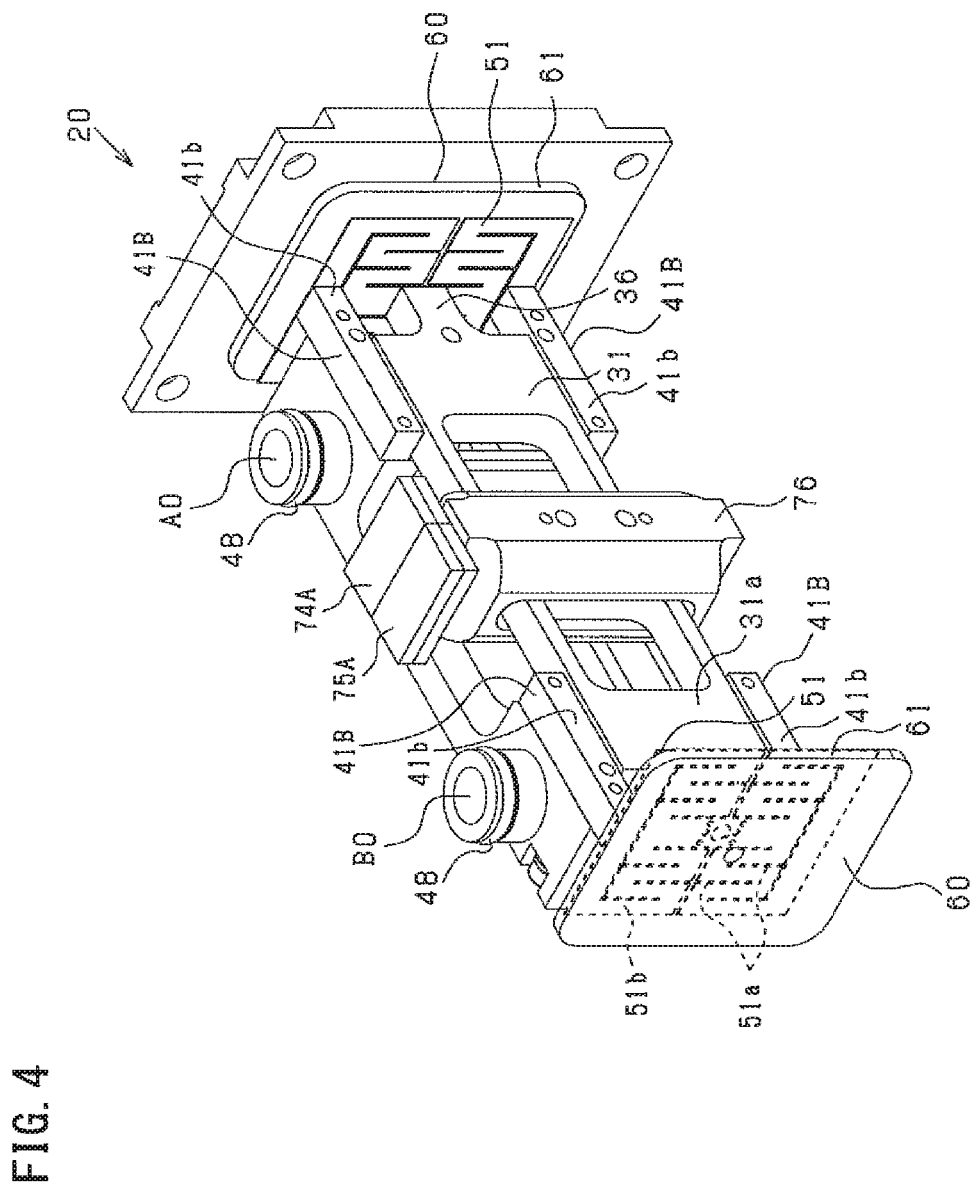
FIG. 4 is a perspective view corresponding to FIG. 3 and showing a state in which the ports and the first main body on one side are removed.

FIG. 3 shows the valve mechanism 20 of FIG. 2, with the housing 21 and the cover 27 removed therefrom. FIG. 4 shows the valve mechanism 20 of FIG. 3, with the C0 port removed therefrom and the A0 port, the B0 port, and the first main body 41A on one side removed therefrom. The valve body 31, the main bodies 41A and 41B, the plate springs 51, the magnets 74A, 74B, 75A, and 75B, etc. are disposed inside the housing 21. Each of the main bodies 41A and 41B has the shape of a rectangular parallelepiped (the shape of a flat plate). The first main bodies 41A are fixed to the housing 21. The second main bodies 41B are fixed to the first main bodies 41A. The valve body 31 has the shape of a rectangular parallelepiped (the shape of a flat plate).

The valve body 31 is disposed between the second main bodies 41B disposed in parallel. A gap is formed between each of the second main bodies 41B and the valve body 31. Namely, the valve body 31 does not contact with the second main bodies 41B.

The valve body 31 is fixed to the second main bodies 41B through the plate springs 51. Specifically, the plate springs 51 are respectively attached to opposite ends 36 of the valve body 31 in the longitudinal direction thereof. Each of the plate springs 51 is formed of a spring material such as spring steel and has the shape of a rectangular plate. Each plate spring 51 has slits 51a formed at predetermined positions. As a result of formation of the slits 51a in the plate springs 51, the plate springs 51 each have a predetermined meandering pattern. The thickness of the plate springs 51 is set such that each of the plate springs 51 has a predetermined rigidity and generates a predetermined elastic force. Two short-side portions 51b of each plate spring 51 are fixed to the corresponding second main bodies 41B. Each plate spring 51 is fixed to the corresponding second main bodies 41B such that its main faces (vertical surfaces in FIGS. 3 and 4) having the largest area extend perpendicularly to the longitudinal direction of the valve body 31. By virtue of such a configuration, the valve body 31 (corresponding to the movable member) is supported by the pair of plate springs 51 to be movable in the longitudinal direction of the valve body 31 (corresponding to the predetermined direction).

Figure 6:
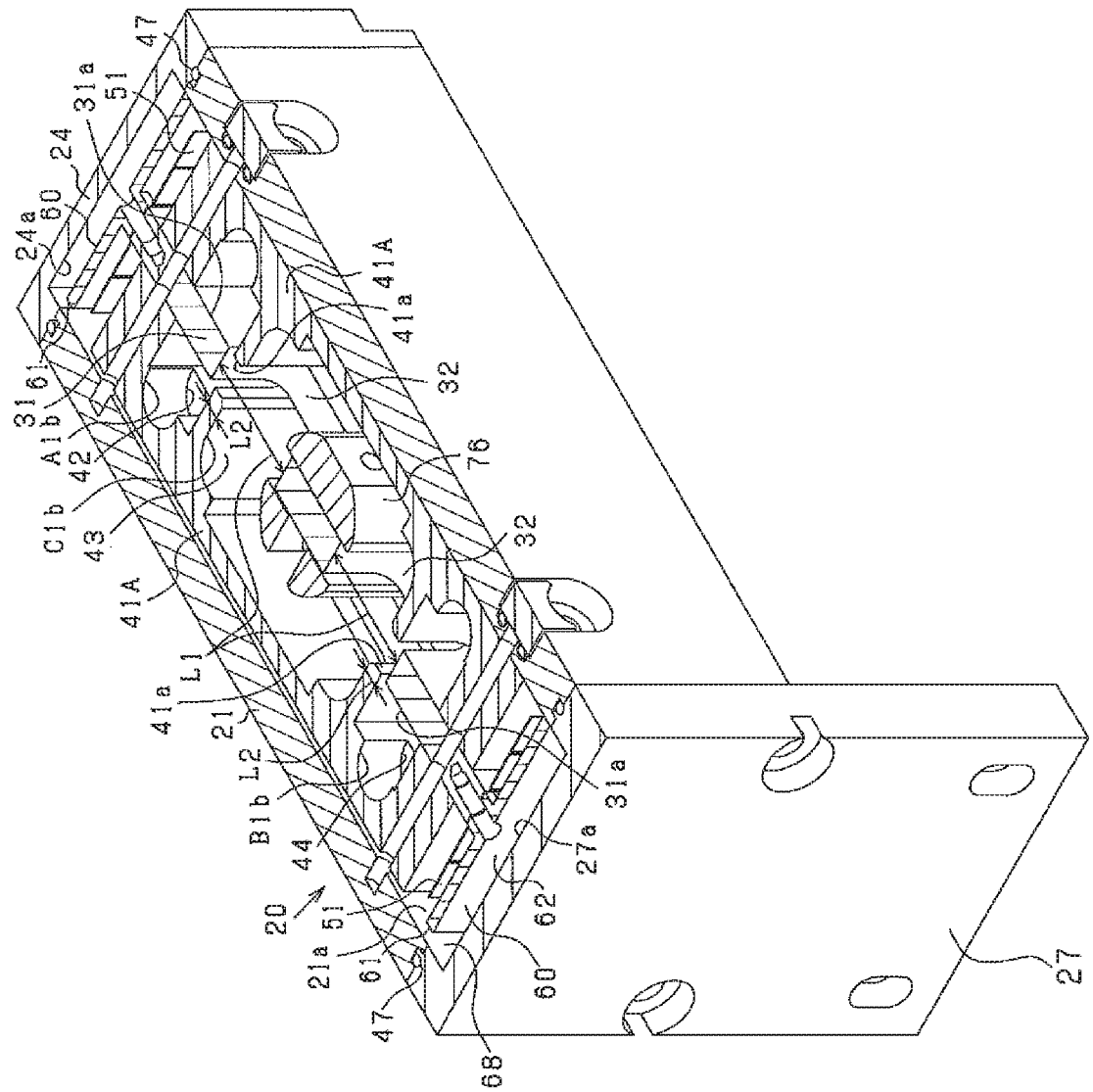
FIG. 6 is a perspective sectional view showing the valve mechanism.

Predetermined surfaces 31a of the valve body 31 are flush with corresponding first surfaces 41b of the second main bodies 41B. As shown in FIG. 6, facing surfaces 41a of the first main bodies 41A face the predetermined surfaces 31a of the valve body 31. The first surfaces 41b of the second main bodies 41B face the facing surfaces 41a of the first main bodies 41A. Gaps are formed between the predetermined surfaces 31a of the valve body 31 and the facing surfaces 41a of the first main bodies 41A. Therefore, the valve body 31 has no portion which slides on other members.

As shown in FIG. 6, the valve body 31 has two open flow passages 32 which are open to the predetermined surfaces 31a over a predetermined length L1 as measured in the longitudinal direction of the valve body 31 (hereinafter referred to as the "predetermined direction"). The open flow passages 32 penetrate the valve body 31 in a direction orthogonal to the predetermined surfaces 31a and each have the shape of an oval hole whose length along the major axis is the predetermined length L1. Notably, there can be employed a configuration in which the open flow passages 32 are recesses formed on the predetermined surfaces 31a of the valve body 31 and do not penetrate the valve body 31.

Each of the first main bodies 41A has an A1b port, a C1b port, and a B1b port (corresponding to the plurality of ports) which are open to the facing surface 41a. The A1b port, the C1b port, and the B1b port are formed at intervals L2 in the longitudinal direction of the valve body 31. The intervals L2 are shorter than the predetermined length L1. Each of the first main bodies 41A has connection flow passages 42, 43, and 44 which are connected to the A1b port, the C1b port, and the B1b port, respectively. The connection flow passages 42, 43, and 44 are connected to the above-described first output flow passage, input flow passage, and second output flow passage, respectively. Notably, the connection flow passage 43 is connected to the input flow passage through a space inside the housing 21. The space inside the housing 21 is sealed by seal members 47 and seal members 48 (see FIG. 3).

The predetermined surfaces 31a of the valve body 31 and the facing surfaces 41a of the main bodies 41 are finished to have a predetermined degree of flatness. Also, the plate springs 51 support the valve body 31 such that the predetermined surfaces 31a and the facing surfaces 41a have a predetermined degree of parallelism therebetween. Specifically, the opposite longitudinal ends 36 of the valve body 31 penetrate the centers of the plate springs 51 and are fixed thereto.

The plate springs 51 apply elastic force to the valve body 31 in accordance with the amount of movement of the valve body 31 in the longitudinal direction of the valve body 31 (a direction orthogonal to the main faces of the plate springs 51). Specifically, the plate springs 51 apply to the valve body 31 an elastic force which is proportional to the amount of movement of the valve body 31 in the longitudinal direction of the valve body 31; i.e., the amounts of deformation of the plate springs 51.

Dampers 60 are attached to opposite ends 36 of the valve body 31 in the above-mentioned predetermined direction. Namely, the dampers 60 are attached to the valve body 31 to be located further outward from the valve body 31 than the plate springs 51 as viewed in the above-mentioned predetermined direction. The dampers 60 are formed into the shape of a rectangular plate. The dampers 60 are formed such that their outer circumferential surfaces 61 extend along an inner surface 21a of the housing 21. As a result, an annular predetermined gap 61g is formed between the inner surface 21a of the housing 21 and the outer circumferential surface 61 of each damper 60. The dampers 60 are fixed to the valve body 31 such that their main faces 62 having the largest area become perpendicular to the above-mentioned predetermined direction.

A sectioned, predetermined space 68 is defined by the inner surface 21a of the housing 21, an inner surface 27a of the cover 27, and one damper 60. The predetermined space 68 is formed in one end (in the above-mentioned predetermined direction) of a container composed of the housing 21, the cover 27, and the connection member 24; specifically, the predetermined space 68 is formed in the cover 27. The predetermined space 69 is defined by the inner surface 21a of the housing 21, an inner surface 24a of the connection member 24, and the other damper 60. The predetermined space 69 is formed in the other end (in the above-mentioned predetermined direction) of the container composed of the housing 21, the cover 27, and the connection member 24; specifically, the predetermined space 69 is formed in the connection member 24. Notably, the container contains therein the valve body 31, the plate springs 51, the first main bodies 41A, and the second main bodies 41B.

One of the predetermined gaps 61g establishes communication in the above-mentioned predetermined direction between the predetermined space 68 and the exterior of the predetermined space 68, and the other predetermined gap 61g establishes communication in the above-mentioned predetermined direction between the predetermined space 69 and the exterior of the predetermined space 69. The size of the predetermined gaps 61g is set to 0.2 mm to 5 mm in accordance with the type and characteristics of the refrigerant (fluid). When the predetermined gaps 61g are excessively small, an excessively large flow resistance acts on the refrigerant passing through the predetermined gaps 61g, and the responsiveness of the valve body 31 may decrease. Meanwhile, when the predetermined gaps 61g are excessively large, the flow resistance acting on the refrigerant passing through the predetermined gaps 61g becomes excessively small, and the effect of damping oscillation of the valve body 31 may become smaller. Each damper 60 is positioned in relation to the valve body 31 by two positioning pins (not shown). The two positioning pins prevent the damper 60 from rotating along a plane perpendicular to the above-mentioned predetermined direction.

Figure 5:
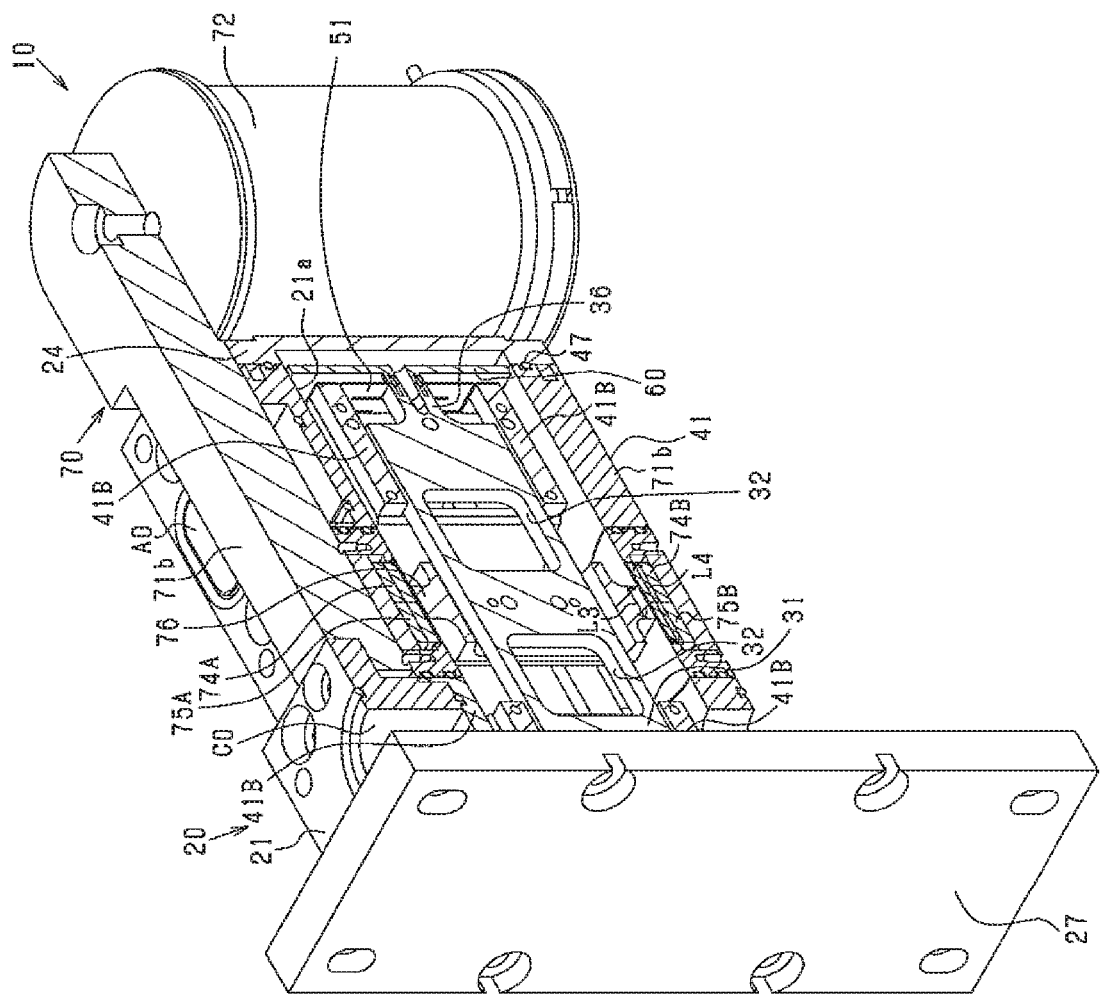
FIG. 5 is a perspective sectional view showing the flow rate ratio control valve.

Next, the structure of the drive unit 70 will be described with reference to FIGS. 1 and 5. The drive unit 70 includes a core 71 (71a, 71b), a coil 72, the magnets 74A, 74B, 75A, and 75B, etc.

The core 71 is formed of a paramagnetic material and has a "U" like shape. The coil 72 is wound around a portion 71a of the core 71, which portion corresponds the bottom of the letter "U." A pair of straight portions 71b of the core 71, which portions correspond to the pair of straight portions of the letter "U," are parallel to each other.

The magnets 74A and 75A and the magnets 74B and 75B are attached to the pair of straight portions 71b. Each of the magnets 74A to 75B is a permanent magnet formed of a ferromagnetic material. Each of the magnets 74A to 75B has the shape of a rectangular parallelepiped. The magnets 74A and 75B are attached to the straight portions 71b of the core 71 such that their S poles are located on the side toward the straight portions 71b of the core 71 and their N poles are located on the side toward the valve body 31 (the movable element 76). The magnets 74B and 75A are attached to the straight portions 71b of the core 71 such that their N poles are located on the side toward the straight portions 71b of the core 71 and their S poles are located on the side toward the valve body 31 (the movable element 76). The N pole of the magnet 74A and the S pole of the magnet 74B face each other, and the S pole of the magnet 75A and the N pole of the magnet 75B face each other. The surfaces of the magnets 74A and 74B which face each other are parallel to each other, and the surfaces of the magnets 75A and 75B which face each other are parallel to each other. The magnets 74A and 75A are disposed at a predetermined interval in the longitudinal direction of the valve body 31 (hereinafter referred to as the "predetermined direction"), and the magnets 74B and 75B are disposed at the predetermined interval in the predetermined direction.

The movable element 76 is disposed between the magnets 74A and 75A and the magnets 74B and 75B with portions of the housing 21 intervening therebetween. The portions of the housing 21 intervening between the magnets 74A and 74B and the portions of the housing 21 intervening between the magnets 75A and 75B are formed to be thin so that magnetic fluxes easily pass through these portions. The movable element 76 is formed of a paramagnetic material and has a rectangular tubular shape. The width L3 of the movable element 76 as measured in the predetermined direction is smaller than the spacing L4 between the end surface of the magnet 74B (74A) on the connection member 24 side and the end surface of the magnet 75B (75A) on the cover 27 side. The valve body 31 extends through a hollow space of the movable element 76. The movable element 76 is fixed to the center of the valve body 31 in the above-mentioned predetermined direction. Namely, the movable element 76 is fixed to a portion of the valve body 31, which portion is located between the pair of plate springs 51. The movable element 76 does not contact with members other than the valve body 31.

In the above-mentioned predetermined direction, the movable element 76 is located at the center position (neutral position) between the magnet 74A (74B) and the magnet 75A (75B) due to magnetic forces of the magnets 74A, 74B, 75A, and 75B. In this state, the movable element 76 is fixed to the valve body 31 supported by the pair of plate springs 51 in the natural state. Namely, in the drive unit 70, the position of the movable element 76 in a state in which the plate springs 51 support the valve body 31 in the natural state is set to a neutral position at which the movable element 76 is located when electromagnetic force for reciprocating the valve body 31 (the movable element 76) in the above-mentioned predetermined direction is not applied to the movable element 76. The drive unit 70 drives the valve body 31 in the above-mentioned predetermined direction in a non-contact state by means of the electromagnetic force applied to the movable element 76 at a position between the pair of plate springs 51 in the above-mentioned predetermined direction. When the valve body 31 is driven by the drive unit 70 in the above-mentioned predetermined direction, the size of the above-mentioned gaps 61g is maintained constant. Namely, the size of the gaps 61g is constant irrespective of the positions of the dampers 60 in the above-mentioned predetermined direction.

Next, the principle of reciprocating the valve body 31 in the longitudinal direction of the valve body 31 (the predetermined direction) by the drive unit 70 will be described with reference to FIGS. 7 to 9.

Figure 7:
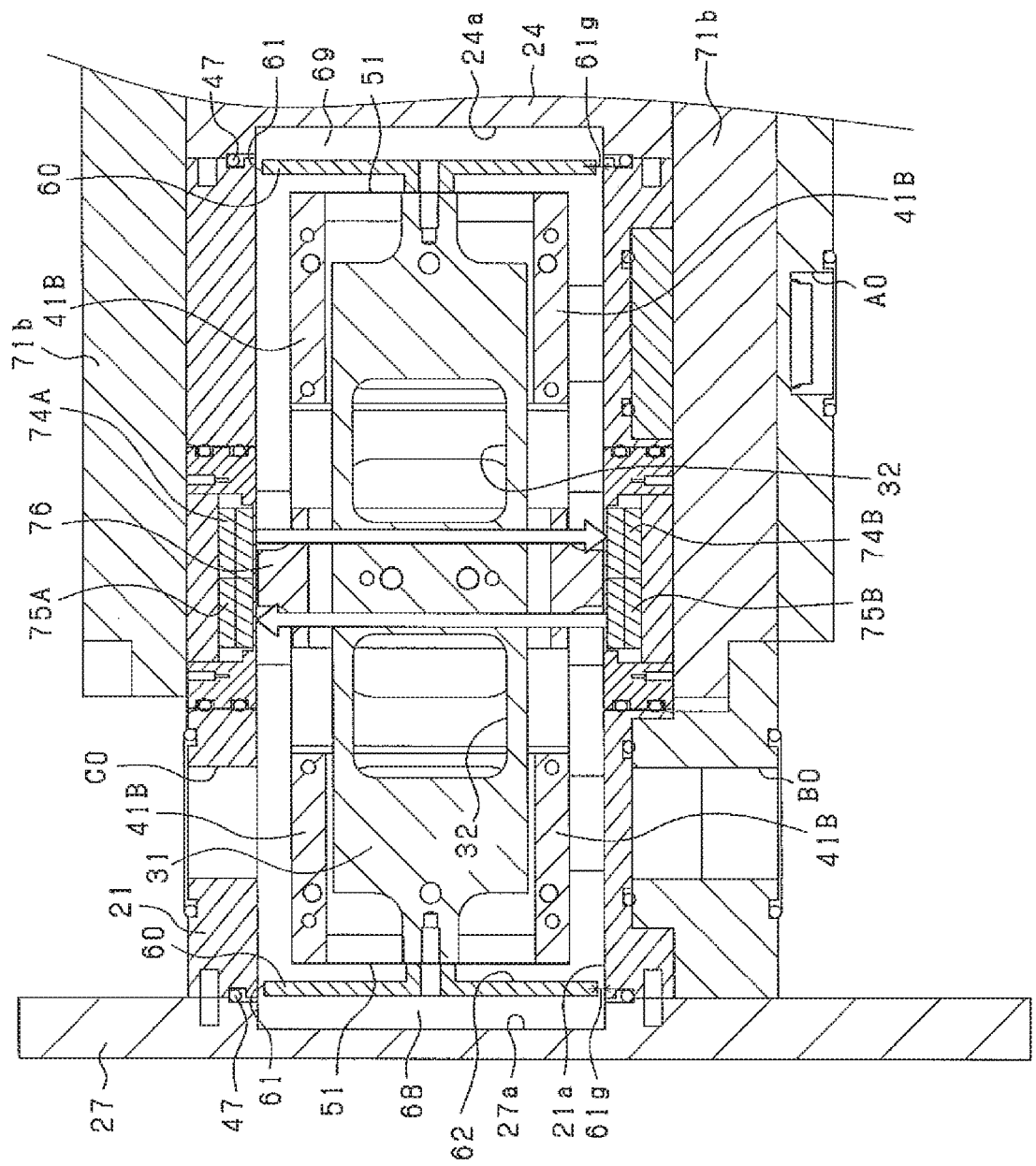
FIG. 7 is a front sectional view showing the valve mechanism in a state in which the valve mechanism is not magnetically excited.

In a state in which the valve mechanism 20 is not magnetically excited; i.e., a state in which no current is supplied to the coil 72 of the drive unit 70, as shown in FIG. 7, a magnetic field extending from the N pole of the magnet 74A toward the S pole of the magnet 74B and a magnetic field extending from the N pole of the magnet 75B toward the S pole of the magnet 75A are generated. In this state, the movable element 76 is at rest in the neutral position in the predetermined direction because the generated magnetic fields are in balance. In this state, since the pair of plate springs 51 are in the natural state, no force is applied from the pair of plate springs 51 to the valve body 31. Also, in this state, the A1b port and the B1b port of each first main body 41A are opened by predetermined respective amounts by the valve body 31 as shown in FIG. 6.

Figure 8:
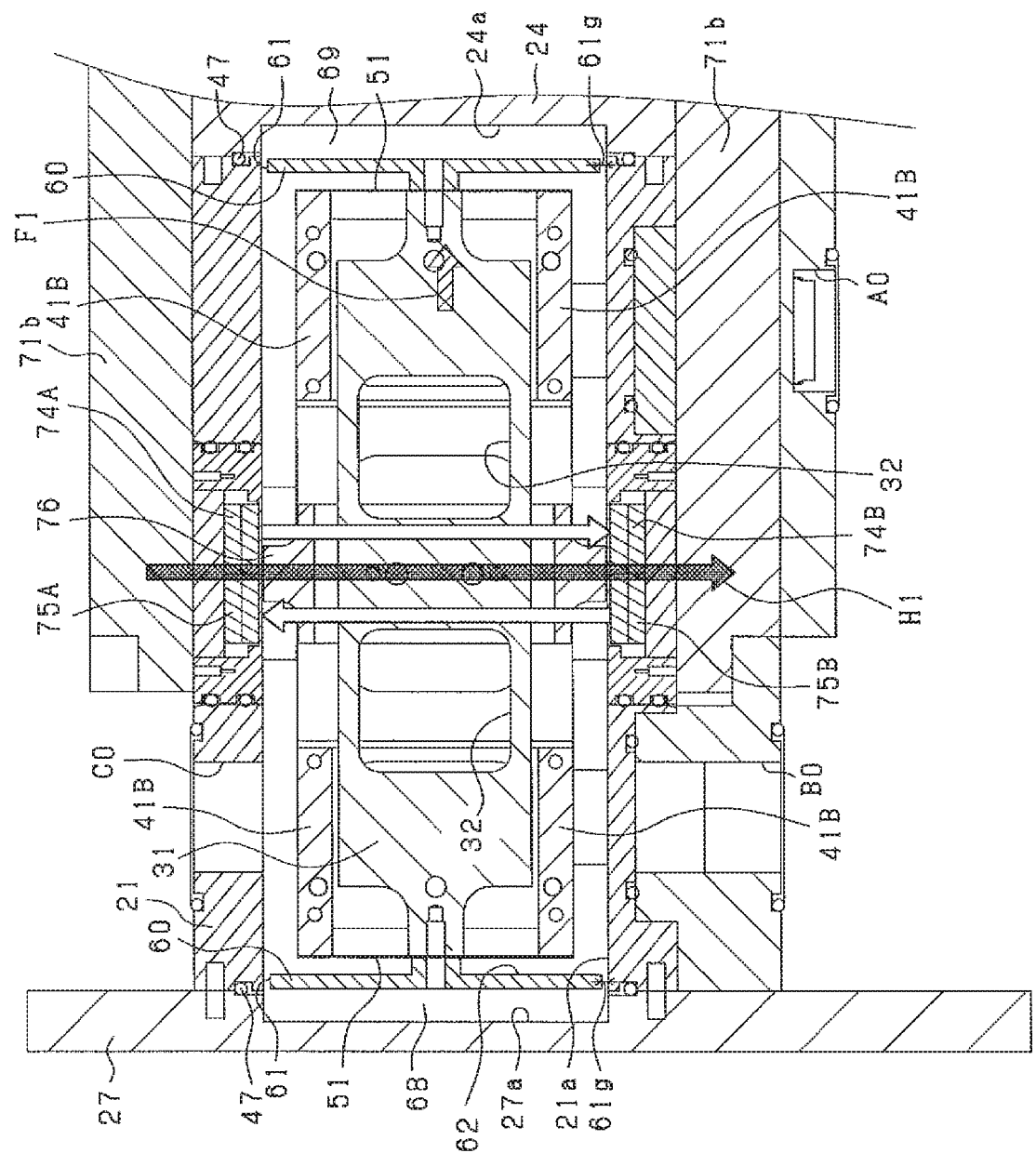
FIG. 8 is a front sectional view showing the valve mechanism in a state in which the valve mechanism is magnetically excited in a negative direction.

In a state in which the valve mechanism 20 is magnetically excited in a negative direction; i.e., in a state in which a current of a negative direction is supplied to the coil 72 of the drive unit 70, a coil magnetic field extending from the upper straight portion 71b of the core 71 toward the lower straight portion 71b of the core 71 is generated as indicated by an arrow H1 in FIG. 8. Therefore, the magnetic field extending from the N pole of the magnet 74A toward the S pole of the magnet 74B and the coil magnetic field strengthen each other, and the magnetic field extending from the N pole of the magnet 75B toward the S pole of the magnet 75A and the coil magnetic field weaken each other.

As a result, the movable element 76 receives a magnetic attraction force toward the connection member 24. Thus, as indicated by an arrow F1, the valve body 31 moves, together with the movable element 76, in the direction of the arrow F1. At that time, by means of electromagnetic force, the drive unit 70 drives the valve body 31 in a non-contact state, and the valve body 31 is driven without coming into contact with the main bodies 41A and 41B. When the valve body 31 is driven, the pair of plate springs 51 apply to the valve body 31 a reaction force which is proportional to the amount of movement of the valve body 31.

In FIG. 6, when the valve body 31 is moved toward the connection member 24, the region through which the C1b port and the A1b port of each first main body 41A are connected via the open flow passage 32 of the valve body 31 is expanded. Meanwhile, the region through which the C1b port and the B1b port of each first main body 41A are connected via the open flow passage 32 of the valve body 31 is reduced. Namely, the flow rate ratio of the refrigerant supplied from the C1b port (C0 port) to the A1b port (A0 port) is increased, and the flow rate ratio of the refrigerant supplied from the C1b port (C0 port) to the B1b port (B0 port) is decreased.

The same refrigerant is supplied to the C1b ports of the respective first main bodies 41A. As a result, the pressure produced by the refrigerant flowing toward the valve body 31 from the C1b port of one of the first main bodies 41A and the pressure produced by the refrigerant flowing toward the valve body 31 from the C1b port of the other first main body 41A are cancelled out.

Figure 9:
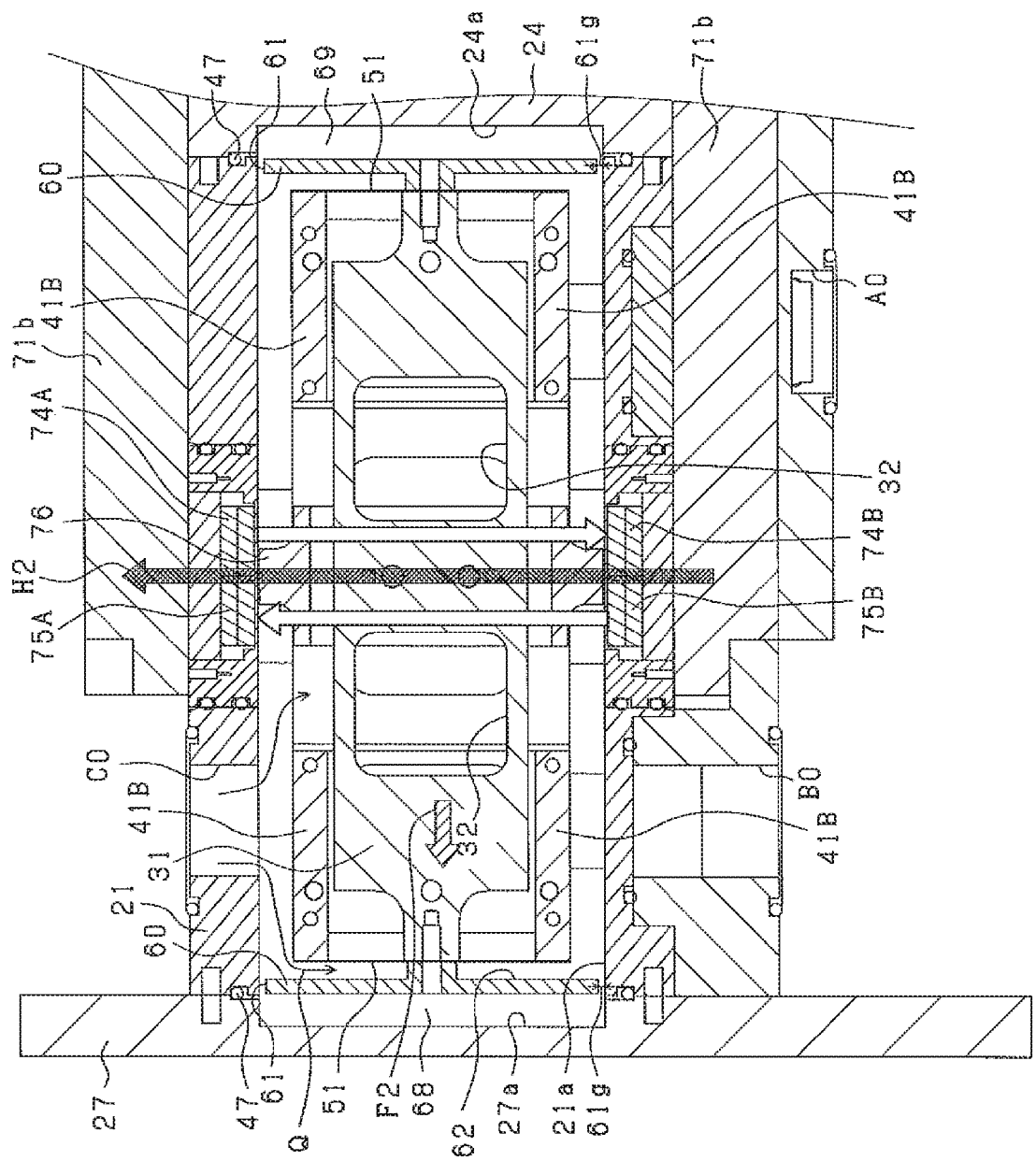
FIG. 9 is a front sectional view showing the valve mechanism in a state in which the valve mechanism is magnetically excited in a positive direction.

In a state in which the valve mechanism 20 is magnetically excited in a positive direction; i.e., in a state in which a current of a positive direction is supplied to the coil 72 of the drive unit 70, a coil magnetic field extending from the lower straight portion 71b of the core 71 toward the upper straight portion 71b of the core 71 is generated as indicated by an arrow H2 in FIG. 9. Therefore, the magnetic field extending from the N pole of the magnet 74A toward the S pole of the magnet 74B and the coil magnetic field weaken each other, and the magnetic field extending from the N pole of the magnet 75B toward the S pole of the magnet 75A and the coil magnetic field strengthen each other.

As a result, the movable element 76 receives a magnetic attraction force toward the cover 27. Thus, as indicated by an arrow F2, the valve body 31 moves, together with the movable element 76, in the direction of the arrow F2. At that time, by means of electromagnetic force, the drive unit 70 drives the valve body 31 in a non-contact state, and the valve body 31 is driven without coming into contact with the main bodies 41A and 41B. When the valve body 31 is driven, the pair of plate springs 51 apply to the valve body 31 a reaction force which is proportional to the amount of movement of the valve body 31.

In FIG. 6, when the valve body 31 is moved toward the cover 27, the region through which the C1b port and the B1b port of each first main body 41A are connected via the open flow passage 32 of the valve body 31 is expanded. Meanwhile, the region through which the C1b port and the A1b port of each first main body 41A are connected via the open flow passage 32 of the valve body 31 is reduced. Namely, the flow rate ratio of the refrigerant supplied from the C1b port (C0 port) to the B1b port (B0 port) is increased, and the flow rate ratio of the refrigerant supplied from the C1b port (C0 port) to the A1b port (A0 port) is decreased.

Figure 10:
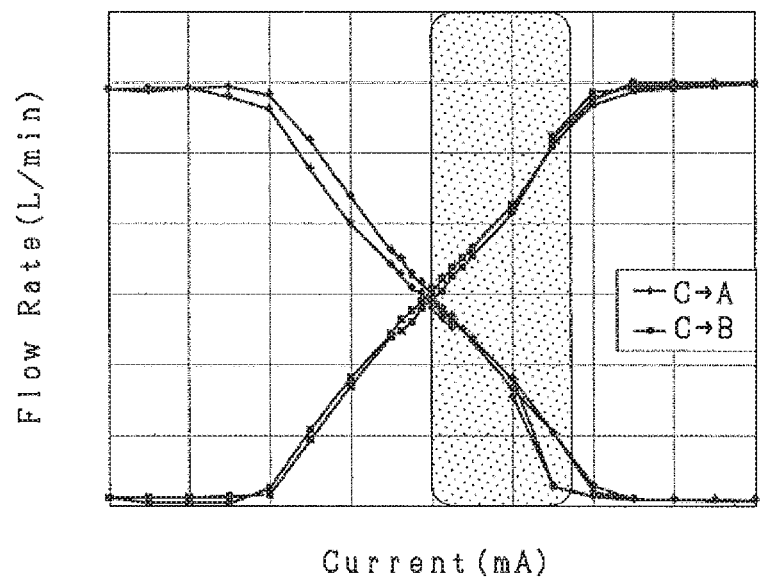
FIG. 10 is a graph showing the relation among drive current, flow rate, and an oscillation generation range.
Figure 11:
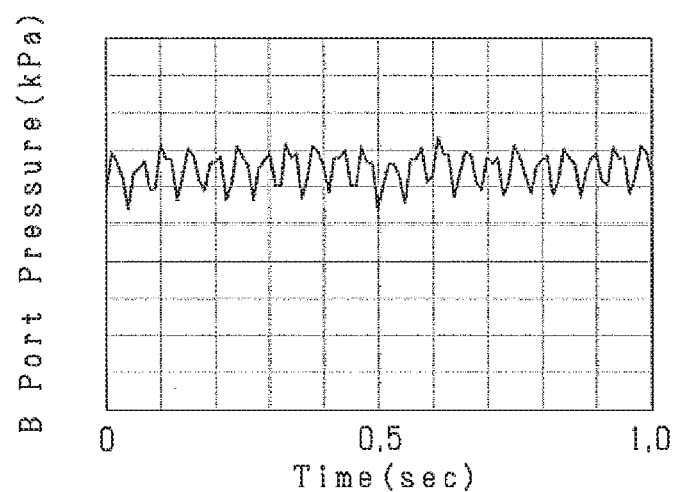
FIG. 11 is a time chart showing the B port pressure of a flow rate ratio control valve of a comparative example.

The persons having disclosed the present application paid attention to the fact that, in the case where the dampers 60 do not exist, as shown in FIG. 10, the valve body 31 oscillates in a specific region (a hatched region) in which the flow rate of the refrigerant supplied from the C port (the C0 port, the C1b port) to the B port (the B0 port, the B1b port) is larger than the flow rate of the refrigerant supplied from the C port to the A port (the A0 port, the A1b port). In this case, as shown in FIG. 11, in a comparative example which does not include the dampers 60, the pressure of the refrigerant supplied to the B port fluctuates relatively greatly at a frequency of 22 Hz.

A conceivable cause of the oscillation is that, when the valve body 31 moves toward the cover 27 as shown in FIG. 9, the flow of the refrigerant hits against the bent plate spring 51 as indicated by an arrow Q. Specifically, when the flow velocity of the refrigerant flowing along the main face of the plate spring increases, a swirl is generated in the flow of the refrigerant, and due to the swirl, an irregular force acts on the plate spring. Conceivably, as in a state in which a flag flutters in the wind, the flow of the refrigerant causes resonation of the plate spring 51 and the valve body 31 oscillates in a predetermined direction. In addition, since the valve body 31 has no sliding portion, there arises a problem in that once the valve body 31 starts to oscillate, force for damping the oscillation is unlikely to act on the valve body 31 and the oscillation of the valve body 31 is unlikely to stop.

Figure 12:
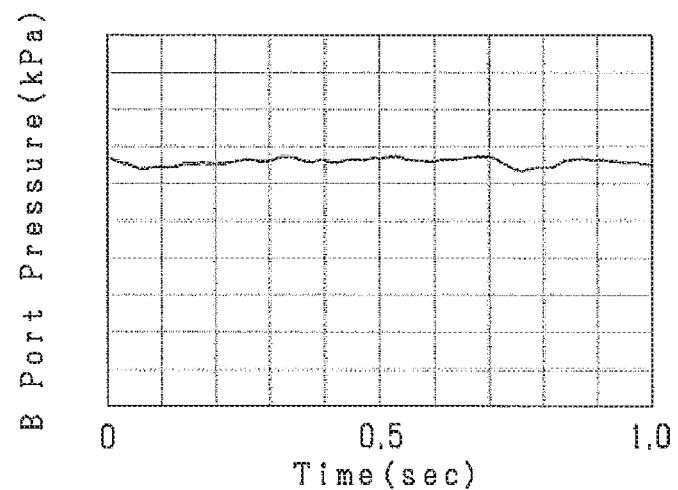
FIG. 12 is a time chart showing the B port pressure of the flow rate ratio control valve of the present embodiment.

In contrast, in the present embodiment, the dampers 60 are attached to the valve body 31. Therefore, when the valve body 31 oscillates in the predetermined direction, the refrigerant flows into the predetermined space 68 or flows out from the predetermined space 68. When the refrigerant passes through the predetermined gaps 61g, resistances are produced, and forces for restricting the movements of the dampers 60 act on the dampers 60. Thus, damping force for damping oscillation of the valve body 31 acts on the valve body 31. As a result, as shown in FIG. 12, in the present embodiment including the dampers 60, the fluctuation of the pressure of the refrigerant supplied to the B port is suppressed.

The present embodiment having been described in detail above has the following advantages.

The pair of plate springs 51 apply elastic force in the predetermined direction in accordance with the amount of deformation of the plate springs 51. Since the valve body 31 is supported by the pair of plate springs 51 to be movable in the above-mentioned predetermined direction, the valve body 31 can be movably supported without involving sliding movement. The valve body 31 is driven in the predetermined direction in a non-contact state by means of electromagnetic force applied by the drive unit 70. As a result, no frictional force is generated during the drive of the valve body 31, whereby responsiveness in driving the valve body 31 can be improved. Further, since the valve body 31 is driven without involving sliding movement, the valve body 31 is free of wear, and can be used semi-permanently unlike the case of an ordinary valve body involving sliding movement.

The valve body 31 is supported by the pair of plate springs 51, and electromagnetic force is applied to a region between the pair of plate springs 51 in the above-mentioned predetermined direction. Therefore, it is possible to prevent swaying of the valve body 31 when the valve body 31 is driven.

The plate springs 51 and the valve body 31 are contained in the container. The dampers 60 are attached to the valve body 31, and the sectioned, predetermined spaces 68 and 69 are defined by the dampers 60 and the inner surfaces 21a, 27a, and 24a of the container. The predetermined gaps 61g for establishing communications in the predetermined direction between the predetermined spaces 68 and 69 and spaces outside the predetermined spaces 68 and 69 are formed between the dampers 60 and the inner surfaces 21a, 27a, and 24a of the container. Therefore, when the dampers 60 are driven in the predetermined direction together with the valve body 31, the refrigerant flows into or flows out of the predetermined spaces 68 and 69 through the predetermined gaps 61g. Therefore, by means of the resistance acting on the refrigerant when passing through the predetermined gaps 61g, the damping force for damping oscillation of the valve body 31 can be applied to the valve body 31, and oscillation of the valve body 31 can be suppressed. Since oscillation of the valve body 31 can be suppressed without involving sliding movement of the valve body 31 in relation to another member, a decrease in the responsiveness of the valve body 31 can be suppressed.

The refrigerant can be caused to flow, through the connection flow passages 42, 43, and 44 formed in the first main bodies 41A, to or from the A1b ports, the C1b ports, and the B1b ports connected to the connection flow passages 42, 43, and 44. The valve body 31 has the open flow passages 32 which are open to the predetermined surfaces 31a over the predetermined length L1 in the predetermined direction. Each of the first main bodies 41A has a plurality of ports (the A1b port, the C1b port, and the B1b port) which are formed at the interval L2 shorter than the predetermined length L1 in the predetermined direction such that the ports are open to the facing surfaces 41a of the first main bodies 41A which face the predetermined surfaces 31a. Therefore, by driving the valve body 31 in the above-mentioned predetermined direction by the drive unit 70, the state of connection of the plurality of ports (the A1b port, the C1b port, and the B1b port) through the open flow passages 32 of the valve body 31; i.e., the flow state of the refrigerant, can be controlled.

The container which contains the plate springs 51 and the valve body 31 therein contains the first main bodies 41A therein. Therefore, the refrigerant having flowed from the above-described ports to a region around the valve body 31 flows through the interior of the container and flows in or flows out of the above-described predetermined spaces 68 and 69 through the above-described predetermined gaps 61g. Accordingly, the refrigerant whose flow state is controlled by the valve body 31 can be used as the refrigerant for damping oscillation of the valve body 31. Therefore, it is unnecessary to separately prepare refrigerant dedicated for the dampers 60.

The dampers 60 are attached to the valve body 31 to be located further outward from the valve body 31 than the plate springs 51 as viewed in the predetermined direction. Therefore, as compared with a structure in which the dampers 60 are attached to the valve body 31 to be located closer to the valve body 31 than the plate springs 51 as viewed in the predetermined direction, it becomes easier to reduce the sizes of the predetermined spaces 68 and 69 defined by the dampers 60 and the inner surfaces 21a, 27a, and 24a of the container. Therefore, the predetermined spaces 68 and 69 can be formed easily.

Since the dampers 60 are formed to have a plate-like shape, the shape of the dampers 60 can be simplified, and the spaces in which the dampers 60 are disposed can be made smaller. The predetermined gaps 61g are annularly formed between the outer circumferential surfaces 61 of the dampers 60 and the inner surfaces 21a, 27a, and 24a of the container. Therefore, it is possible to prevent the resistance of the refrigerant from unevenly acting on portions of the dampers 60. As a result, it becomes easier to stabilize the attitudes of the dampers 60 and thus the attitude of the valve body 31.

Since the dampers 60 are fixed to the valve body 31 such that their main faces 62 having the largest area become perpendicular to the predetermined direction. Therefore, when the dampers 60 are driven in the predetermined direction together with the valve body 31, it is possible to cause the refrigerant to impinge against the dampers 60 at a right angle, thereby preventing leaning of the dampers 60 and tilting of the valve body 31.

When the valve body 31 is driven in the predetermined direction in a non-contact state by the drive unit 70, the size of the predetermined gaps 61g is maintained constant. Therefore, when the valve body 31 is driven, it is possible to suppress changes in the flow of the refrigerant passing through the predetermined gaps 61g, and it becomes easier to stabilize the attitudes of the dampers 60 and thus the attitude of the valve body 31.

The predetermined spaces 68 and 69 are formed at the ends of the container in the predetermined direction. Therefore, in the flow rate ratio control valve 10, the predetermined spaces 68 and 69 can be secured easily, and interference between the dampers 60 and other components can be prevented more easily.

The size of the predetermined gaps 61g is set to 0.2 mm to 5 mm in accordance with the type and characteristics of the refrigerant. Therefore, an adequate damping force can be applied to the driven valve body 31. Thus, it is possible to suppress a decrease in the responsiveness of the valve body 31 while damping oscillation of the valve body 31.

Each of the dampers 60 is prevented, by positioning pins, from rotating along a plane perpendicular to the predetermined direction. Therefore, it is possible to reliably prevent the predetermined gaps 61g from changing as a result of rotation of the dampers 60 and to prevent the attitudes of the dampers 60 and thus the attitude of the valve body 31 from changing.

Electromagnetic force is applied to the movable element 76 fixed to the valve body 31. Therefore, the valve body 31 can be designed separately from the movable element 76 to which electromagnetic force is applied, whereby the degree of freedom in designing the valve body 31 can be increased.

The plate springs 51 are fixed to the second main bodies 41B such that the main faces of the plate springs 51 having the largest area extend perpendicularly to the predetermined direction. Therefore, the plate springs 51 can easily realize a structure in which the plate springs 51 support the valve body 31, while maintaining the gaps between the predetermined surfaces 31a of the valve body 31 and the facing surfaces 41a of the first main bodies 41A, and apply to the valve body 31 only elastic force along the predetermined direction.

Since the opposite ends 36 of the valve body 31 are supported by the pair of plate springs 51, it becomes easier to stably support the valve body 31.

In the drive unit 70, the position of the valve body 31 (the movable element 76) in a state in which the plate springs 51 support the valve body 31 in the natural state is set to the neutral position at which the valve body 31 (the movable element 76) is located when electromagnetic force for reciprocating the valve body 31 in the predetermined direction is not applied to the movable element 76. By virtue of this configuration, the valve body 31 can be maintained at the neutral position in the predetermined direction in a state in which the plate springs 51 support the valve body 31 in the natural state and no electromagnetic force is applied to the movable element 76 by the drive unit 70. Therefore, by controlling the electromagnetic force applied to the movable element 76 while using the neutral position as a reference, the valve body 31 can be easily reciprocated with excellent reproducibility. Further, the flow rate of the refrigerant in a state in which no electromagnetic force is applied to the movable element 76 by the drive unit 70 can be stabilized at a constant level.

The predetermined surfaces 31a of the valve body 31 and the facing surfaces 41a of the first main bodies 41A are finished to have a predetermined degree of flatness. The plate springs 51 support the valve body 31 such that the predetermined surfaces 31a and the facing surfaces 41a have a predetermined degree of parallelism therebetween. According to such a configuration, the degrees of flatness and parallelism of the predetermined surfaces 31a of the valve body 31 and the facing surfaces 41a of the main bodies 41 are controlled. Therefore, it is possible to increase the accuracy of the gaps formed between the predetermined surfaces 31a and the facing surfaces 41a.

The first main bodies 41A are provided on the opposite sides of the valve body 31. Each of the first main bodies 41A has a plurality of ports; i.e., the A1b port, the C1b port, and the B1b port. Therefore, by causing the same refrigerant to flow through the A1b, C1b, and B1b ports of one first main body 41A and flow through the A1b, C1b, and B1b ports of the other first main body 41A, it is possible to cancel out the pressure generated by the refrigerant flowing toward the valve body 31 from the C1b port of the one first main body 41A and the pressure generated by the refrigerant flowing toward the valve body 31 from the C1b port of the other first main body 41A. Accordingly, it is possible to prevent the valve body 31 from displacing in a direction away from the C1b port due to the pressure of the refrigerant flowing toward the valve body 31 from the C1b port. Also, the required rigidity of the plate springs 51 can be decreased, and thinner plate springs 51 can be employed.

Notably, the above-described embodiment may be modified as follows.

- The positioning pins may be omitted so long as the dampers 60 can be prevented from rotating along the plane perpendicular to the above-described predetermined direction.
- Even in the case where the main faces 62 of the dampers 60 have respective portions which are not perpendicular to the above-mentioned predetermined direction, by disposing the portions symmetrically to form a pair, it becomes possible to cancel the forces for leaning the dampers 60, respectively, when the dampers 60 are driven in the predetermined direction together with the valve body 31.
- There can be employed a structure in which, when the valve body 31 is driven in the predetermined direction in a non-contact state by the drive unit 70, the size of the predetermined gaps 61g decreases as the amount of movement of the valve body 31 from the neutral position increases. When such a structure is employed, the damping force acting on the valve body 31 can be increased as the amount of movement of the valve body 31 from the neutral position increases.

The damper 60 may be attached only at one of the opposite ends 36 of the valve body 31 in the above-mentioned predetermined direction. In this case, depending on the layout of the flow rate ratio control valve 10, the damper 60 is preferably attached to the end 36 disposed on the lower side. In the case where the damper 60 is attached to the end 36 disposed on the upper side, air may remain within the predetermined space defined by the damper 60, and the damping force produced by the damper 60 may decrease. In contrast, in the case where the damper 60 is attached to the end 36 disposed on the lower side, air is less likely to remain within the predetermined space defined by the damper 60, and the damping force produced by the damper 60 can be prevented from decreasing.

There can be employed a structure in which the pair of plate springs 51 support portions of the valve body 31 other than the opposite ends 36; for example, portions of the valve body 31 slightly offset from the opposite ends toward the center of the valve body 31.

In the drive unit 70, the position of the valve body 31 (the movable element 76) at which the plate springs 51 support the valve body 31 in the natural state may be set to a position other than the neutral position at which the valve body 31 is located when electromagnetic force for reciprocating the valve body 31 in the longitudinal direction is not applied to the movable element 76.

There can be employed a structure in which the plate springs 51 attached to the opposite ends 36 of the valve body 31 produce different elastic forces.

Figure 13:
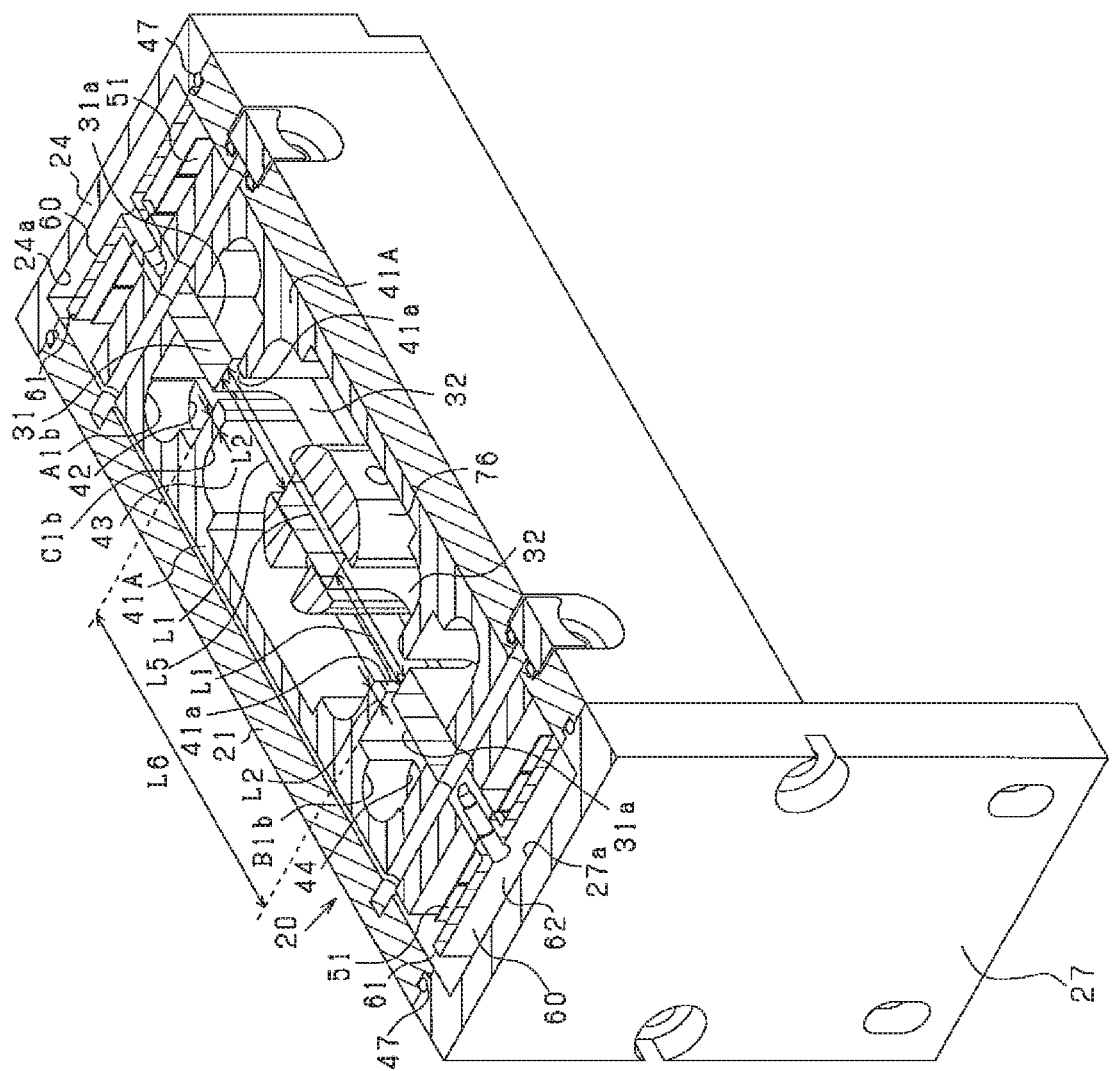
FIG. 13 is a perspective sectional view showing a modification of the valve mechanism.

The flow rate ratio control valve 10 may be configured such that liquid (fluid) is supplied to the A0 port (pressurization port), air is supplied to and discharged from the C0 port (output port), and the liquid is discharged from the B0 port (discharge port). FIG. 13 shows the spacing L5 between the ends of the two open flow passages 32, which ends are more remote from each other than the remaining ends, and the spacing L6 between the A1b port and the B1b port. The relation between the spacing L5 and the spacing L6 can be changed as follows.

Figure 14:
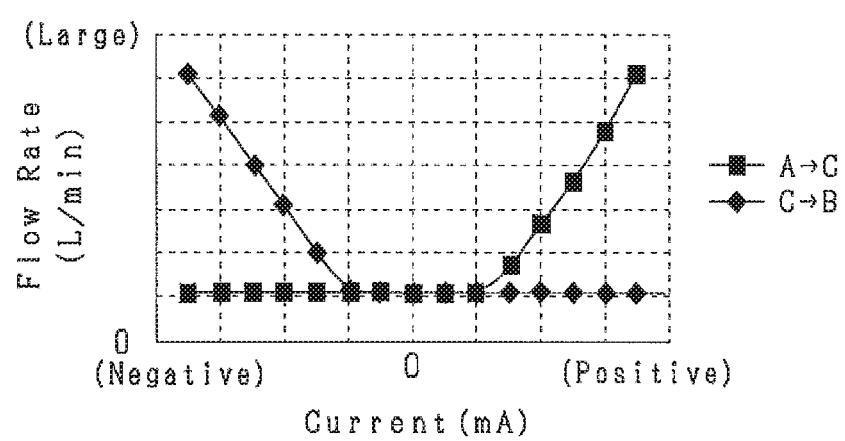
FIG. 14 is a graph showing an exemplary relation between drive current and flow rates.

(1) L6≥L5. In this case, as shown in FIG. 14, the flow rate ratio control valve 10 can be used as a flow passage changeover valve which has a dead zone near the point where the current supplied to the drive unit of the valve is 0 mA, and can stabilize the start of flow of the fluid.

Figure 15:
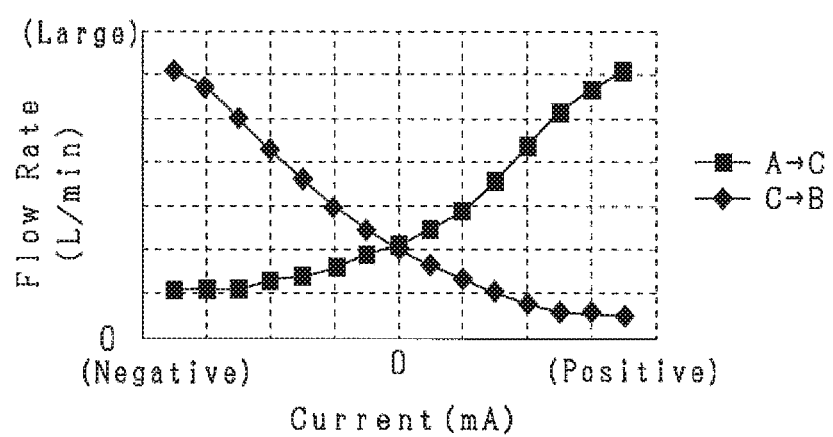
FIG. 15 is a graph showing another exemplary relation between drive current and flow rates.

(2) L6<L5. In this case, as shown in FIG. 15, the flow rate ratio control valve 10 can be used as a flow passage changeover valve which provides a constant bleeding flow rate in a zone near the point where the current supplied to the drive unit of the valve is 0 mA, and can enhance responsiveness in changing the flow rate of the fluid.

Figure 16:
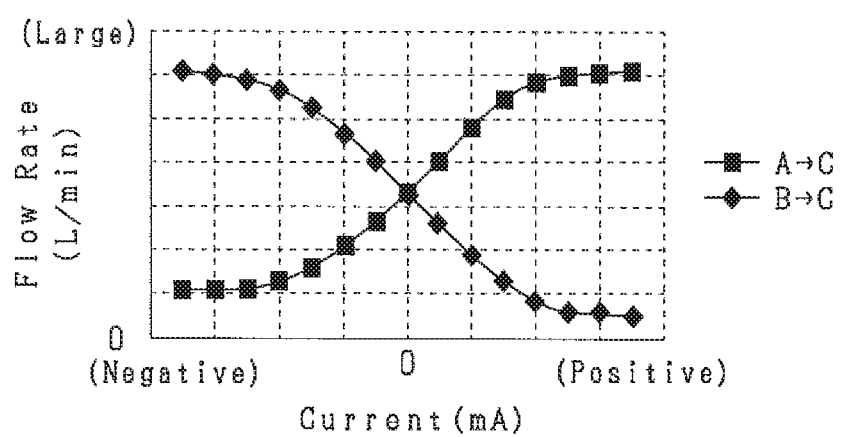
FIG. 16 is a graph showing still another exemplary relation between drive current and flow rates.

(3) L6<<L5. In this case, as shown in FIG. 16, the flow rate ratio control valve 10 can be used as a mixing valve for mixing a fluid flowing from the A port to the C port and a fluid flowing from the B port to the C port. Also, the number of the ports formed on each first main body 41A is not limited to three, and may be two, four, or more. Even in these cases, oscillation of the valve body 31 can be suppressed by the dampers 60.

The configurations of the components of the drive unit 70, such as the coil 72, the core 71, the magnets 74A to 75B, may be changed freely so long as the drive unit 70 can drive the valve body 31 (the movable member) in the predetermined direction in a non-contact state by means of electromagnetic force applied to a region between the pair of plate springs 51 in the predetermined direction.

The movable element 76 and the valve body 31 may be formed as a single member through use of a paramagnetic material. In this case, the movable element itself serves as the valve body 31 (the movable member), and the open flow passages 32 are formed on the movable element.

The present disclosure has been described in conformity with examples but is not limited to the examples and the structures therein. Further, the present disclosure encompasses a variety of variation examples and variations in the scope of equivalents of the present disclosure. In addition, a variety of combinations and forms and even other combinations and forms to which only one element or two or more elements are added fall within the scope and ideological range of the present disclosure.

What is claimed is:

1. An electromagnetic actuator comprising:
a pair of plate springs, each of which applies elastic force in a predetermined direction in accordance with an amount of deformation;
a movable member supported by the pair of plate springs to be movable in the predetermined direction;
a drive unit which drives the movable member in the predetermined direction in a non-contact state by means of electromagnetic force applied to a region between the pair of plate springs in the predetermined direction;
a container in which the plate springs and the movable member are contained; and
dampers attached to opposite ends of the movable member, the dampers defining sectioned predetermined spaces in cooperation with an inner surface of the container, and forming predetermined gaps between the dampers and the inner surface, the predetermined gaps establishing communication in the predetermined direction between the predetermined spaces and the exterior of the predetermined spaces.

2. The electromagnetic actuator according to claim 1, wherein the predetermined spaces are formed to be located further outward from the movable member than the dampers in the predetermined direction.

3. The electromagnetic actuator according to claim 1, wherein the movable member is a valve body having an open flow passage which is open to a predetermined surface of the valve body over a predetermined length in the predetermined direction, wherein the electromagnetic actuator further comprises a main body in which a plurality of ports open to its facing surface facing the predetermined surface are formed such that the ports are arranged in the predetermined direction at an interval shorter than the predetermined length and in which connection flow passages connected to the plurality of ports, respectively, are formed, and wherein the container contains the main body.

4. The electromagnetic actuator according to claim 1, wherein the dampers are attached to the movable member to be located further outward from the movable member than the plate springs as viewed in the predetermined direction.

5. The electromagnetic actuator according to claim 4, wherein
each damper is formed into a plate shape; and each predetermined gap is formed into an annular shape between the inner surface and an outer circumferential surface of each damper, respectively.

6. The electromagnetic actuator according to claim 5, wherein each damper is fixed to the movable member such that a main face of each damper having the largest area becomes perpendicular to the predetermined direction.

7. The electromagnetic actuator according to claim 1, wherein, when the movable member is driven in the predetermined direction in a non-contact state by the drive unit, a size of the predetermined gaps are maintained constant.

8. The electromagnetic actuator according to claim 1, wherein the predetermined spaces are formed in respective ends of the container in the predetermined direction.

9. The electromagnetic actuator according to claim 1, wherein the predetermined gaps have a size of 0.2 mm to 5 mm, respectively.

10. The electromagnetic actuator according claim 1, further comprising positioning pins which prevent the dampers from rotating along a plane perpendicular to the predetermined direction.

11. An electromagnetic actuator comprising:
a pair of plate springs, each of which applies elastic force in a predetermined direction in accordance with an amount of deformation;
a valve body supported by the pair of plate springs to be movable in the predetermined direction and controlling a flow state of liquid;
a drive unit which drives the valve body in the predetermined direction in a non-contact state by means of electromagnetic force applied to a region between the pair of plate springs in the predetermined direction; a container in which the plate springs and the valve body are contained; and
dampers attached to opposite ends of the valve body and forming predetermined gaps between the dampers and an inner surface of the container, the liquid passing through the predetermined gaps in the predetermined direction.

12. The electromagnetic actuator according to claim 11, wherein a-sectioned predetermined spaces in cooperation with the dampers and the inner surface of the container are formed to be located further outward from the movable member than dampers in the predetermined direction.

13. The electromagnetic actuator according to claim 11, wherein the valve body has an open flow passage which is open to a predetermined surface of the valve body over a predetermined length in the predetermined direction,
wherein the electromagnetic actuator further comprises a main body in which a plurality of ports open to its facing surface facing the predetermined surface are formed such that the ports are arranged in the predetermined direction at an interval shorter than the predetermined length and in which connection flow passages connected to the plurality of ports, respectively, are formed, and wherein the container contains the main body.

14. The electromagnetic actuator according to claim 11, wherein the dampers are attached to the valve body to be located further outward from the valve body than the plate springs as viewed in the predetermined direction.

* * * * *